United States Patent
Mashtare et al.

(10) Patent No.: US 9,683,553 B2
(45) Date of Patent: Jun. 20, 2017

(54) SYSTEM AND METHOD FOR MONITORING WIND TURBINE LOADING

(71) Applicant: General Electric Company, Schenectady, NY (US)

(72) Inventors: Dale Robert Mashtare, Simpsonville, SC (US); James Henry Madge, Simpsonville, SC (US); Charudatta Subhash Mehendale, Niskayuna, NY (US); George Albert Goller, Greenville, SC (US); Conner B. Shane, Glenville, NY (US)

(73) Assignee: General Electric Company, Schenectady, NY (US)

( * ) Notice: Subject to any disclaimer, the term of this patent is extended or adjusted under 35 U.S.C. 154(b) by 698 days.

(21) Appl. No.: 14/019,838

(22) Filed: Sep. 6, 2013

(65) Prior Publication Data

US 2015/0069762 A1 Mar. 12, 2015

(51) Int. Cl.
*F16H 57/025* (2012.01)
*F03D 7/04* (2006.01)
(Continued)

(52) U.S. Cl.
CPC ............ *F03D 11/0091* (2013.01); *F03D 9/25* (2016.05); *F03D 17/00* (2016.05); *F16H 57/01* (2013.01);
(Continued)

(58) Field of Classification Search
None
See application file for complete search history.

(56) References Cited

U.S. PATENT DOCUMENTS

| 4,051,427 A | 9/1977 | Kilgore et al. |
| 4,193,005 A | 3/1980 | Kos et al. |

(Continued)

FOREIGN PATENT DOCUMENTS

| DE | 19731918 | 12/2005 |
| EP | 0998634 | 11/2003 |

(Continued)

OTHER PUBLICATIONS

European Search Report and Opinion issued in connection with corresponding EP Application No. 14181595.1 on Jan. 22, 2015.

(Continued)

*Primary Examiner* — Nathaniel Wiehe
*Assistant Examiner* — Jason Davis
(74) *Attorney, Agent, or Firm* — Dority & Manning, P.A.

(57) ABSTRACT

Systems and methods for monitoring wind turbine loading are provided. In one embodiment, a system includes a main shaft, a bedplate, and a gearbox coupled to the main shaft and mounted to the bedplate. The gearbox includes an outer casing and a torque arm extending from the outer casing. The system further includes an isolation mount coupled to the torque arm, and a sensor configured to measure displacement of the torque arm. In another embodiment, a method includes operating the wind turbine, and detecting displacement of a torque arm of a gearbox of the wind turbine. The method further includes calculating a moment for a main shaft of the wind turbine based on the displacement of the torque arm.

10 Claims, 5 Drawing Sheets

(51) Int. Cl.
*F03D 11/00* (2006.01)
*F16H 57/01* (2012.01)
*F03D 17/00* (2016.01)
*F03D 9/25* (2016.01)

(52) U.S. Cl.
CPC ...... *F16H 57/025* (2013.01); *F05B 2270/331* (2013.01); *F05B 2270/821* (2013.01); *F16H 2057/012* (2013.01); *Y02E 10/722* (2013.01)

(56) References Cited

U.S. PATENT DOCUMENTS

| | | | |
|---|---|---|---|
| 4,267,734 A | 5/1981 | Shima et al. | |
| 4,272,992 A | 6/1981 | Shima et al. | |
| 4,276,782 A | 7/1981 | Shima et al. | |
| 4,282,756 A | 8/1981 | Molnar et al. | |
| 4,294,120 A | 10/1981 | Shima et al. | |
| 4,862,749 A | 9/1989 | Yagi | |
| 4,989,458 A | 2/1991 | Suzuki | |
| 6,361,275 B1 | 3/2002 | Wobben | |
| 6,619,918 B1 | 9/2003 | Rebsdorf | |
| 7,004,724 B2 | 2/2006 | Pierce et al. | |
| 7,095,132 B2 | 8/2006 | Kikuchi et al. | |
| 7,160,083 B2 | 1/2007 | Pierce et al. | |
| 7,173,399 B2 | 2/2007 | Sihler et al. | |
| 7,243,557 B2 | 7/2007 | May | |
| 7,437,264 B2 | 10/2008 | Pierce et al. | |
| 7,547,985 B2 | 6/2009 | Takaichi et al. | |
| 7,631,564 B1 | 12/2009 | Sihler et al. | |
| 7,685,891 B2 | 3/2010 | May | |
| 7,755,210 B2 | 7/2010 | Kammer et al. | |
| 7,772,713 B2 | 8/2010 | Huang et al. | |
| 7,880,321 B2 | 2/2011 | Arinaga et al. | |
| 7,891,944 B2 | 2/2011 | Jeppesen et al. | |
| 7,939,956 B1 | 5/2011 | Larsen | |
| 8,067,845 B2 | 11/2011 | Thulke et al. | |
| 8,227,930 B2 | 7/2012 | Goller et al. | |
| 8,261,599 B2 | 9/2012 | Jeffrey et al. | |
| 8,434,996 B2 * | 5/2013 | Bagepalli | F03D 11/0008 415/118 |
| 8,500,400 B2 * | 8/2013 | Signore | B66C 1/108 29/893.1 |
| 8,779,619 B2 * | 7/2014 | Liingaard | F03D 11/0008 290/44 |
| 2009/0025488 A1 | 1/2009 | Sihler et al. | |
| 2009/0149999 A1 | 6/2009 | Schramm et al. | |
| 2009/0320609 A1 | 12/2009 | Xia et al. | |
| 2010/0014971 A1 | 1/2010 | Risager et al. | |
| 2010/0021297 A1 | 1/2010 | Kuhlmeier | |
| 2010/0126115 A1 * | 5/2010 | Lim | E04H 12/085 52/848 |
| 2010/0320769 A1 | 12/2010 | Miranda | |
| 2012/0025526 A1 | 2/2012 | Luo et al. | |
| 2012/0134810 A1 | 5/2012 | Bagepalli et al. | |

FOREIGN PATENT DOCUMENTS

| | | |
|---|---|---|
| EP | 1359321 A1 | 11/2003 |
| EP | 1230479 | 9/2004 |
| EP | 1243790 | 5/2005 |
| NO | 323071 | 12/2006 |
| WO | WO 01/33075 | 5/2001 |
| WO | WO 02/052223 | 7/2002 |
| WO | WO 2008/101496 | 8/2008 |
| WO | WO 2008/113354 | 9/2008 |

OTHER PUBLICATIONS

Zheng et al., U.S. Appl. No. 13/590,430, filed Aug. 21, 2012 "Load Control System and Method for Wind Turbine"

* cited by examiner

SYSTEM AND METHOD FOR MONITORING WIND TURBINE LOADING

FIELD OF THE INVENTION

The present disclosure relates generally to wind turbines, and more particularly to systems and methods for monitoring loading of wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, various components of the wind turbine are subjected to various loads due to the aerodynamic wind loads acting on the blade. In particular, the main shaft coupling the rotor blades and the generator may be subjected to various loads due to the wind loading acting on the rotor blades and resulting reaction loads being transmitted to the shaft. Such loading may include, for example, axial loads and moment loads, such as bending moment loads and torsional (twisting) moment loads. Deflection of the shaft due to these loads may thus frequently occur during operation of the wind turbine. When the loads are significantly high, substantial damage may occur to the rotor shaft, pillow blocks, bedplate and/or various other component of the wind turbine. Thus, the moment loads induced on the shaft due to such loading are particularly critical variables, and in many cases should desirably be monitored and, if necessary, controlled during operation of the wind turbine.

However, currently known systems and methods for monitoring such loads can be difficult to implement and service due to, for example, physical constraints leading to load measurement inaccuracies. For example, proximity probes may be mounted to monitor displacement of a flange on the shaft. However, such probes must be mounted in relatively stable locations, which are typically in small, inaccessible areas, thus making it difficult to install and maintain the probes. Further, such probes require expensive, durable mounting hardware. Still further, the data provided by these probes provides only indirect measurements of the loads to which the shaft is subjected. These various disadvantages can result in inaccuracy and decreased reliability. Further, many monitoring systems are not capable of providing torsional measurements of the drivetrain system. While applications of strain gauges attached to the main shaft have been described and are practiced for measurement of both bending and torsional loads, a variety of challenges (manufacturing, service, data communication from rotating element) with these approaches lead to inaccuracy and poor reliability.

Thus, an improved system and method for monitoring loads in a wind turbine is desired. For example, a system and method that provide more accurate and reliable measurements of shaft loading would be advantageous.

BRIEF DESCRIPTION OF THE INVENTION

Aspects and advantages of the invention will be set forth in part in the following description, or may be obvious from the description, or may be learned through practice of the invention.

In one embodiment, the present disclosure is directed to a system for monitoring wind turbine loading. The system includes a main shaft, a bedplate, and a gearbox coupled to the main shaft and mounted to the bedplate. The gearbox includes an outer casing and a torque arm extending from the outer casing. The system further includes an isolation mount coupled to the torque arm, and a sensor configured to measure displacement of the torque arm.

In another embodiment, the present disclosure is directed to a method for monitoring wind turbine loading. The method includes operating the wind turbine, and detecting displacement of a torque arm of a gearbox of the wind turbine. The method further includes calculating a moment for a main shaft of the wind turbine based on the displacement of the torque arm.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
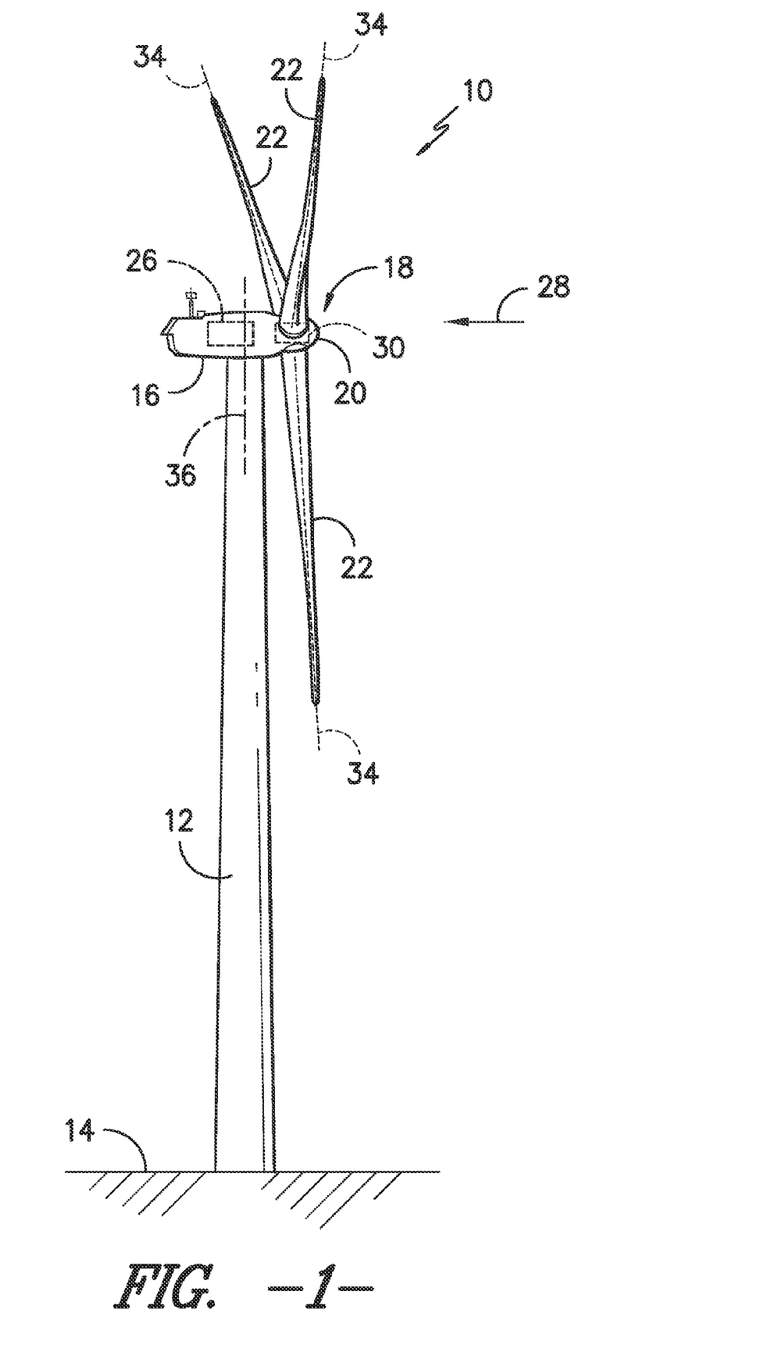
FIG. 1 is a perspective view of a wind turbine according to one embodiment of the present disclosure.

FIG. 1 illustrates perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 (FIG. 2) of the wind turbine, or by directly controlling the operation of the plurality of pitch drives or pitch adjustment mechanisms. Specifically, the rotor blades 22 may be rotatably mounted to the hub 20 by one or more pitch bearing(s) (not illustrated) such that the pitch angle may be adjusted by rotating the rotor blades 22 along their pitch axes 34 using the pitch adjustment mechanisms 32. Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the nacelle 16 may be rotated about the yaw axis 36.

It should be appreciated that the turbine controller 26 and/or the pitch controller 30 may generally comprise a computer or any other suitable processing unit. Thus, in several embodiments, the turbine controller 26 and/or pitch and yaw controllers may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 and/or pitch and yaw controllers may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the turbine controller 26 and/or pitch and yaw controllers to perform various computer-implemented functions. In addition, the turbine controller 26 and/or pitch and yaw controllers may also include various input/output channels for receiving inputs from sensors and/or other measurement devices and for sending control signals to various components of the wind turbine 10.

Figure 2:
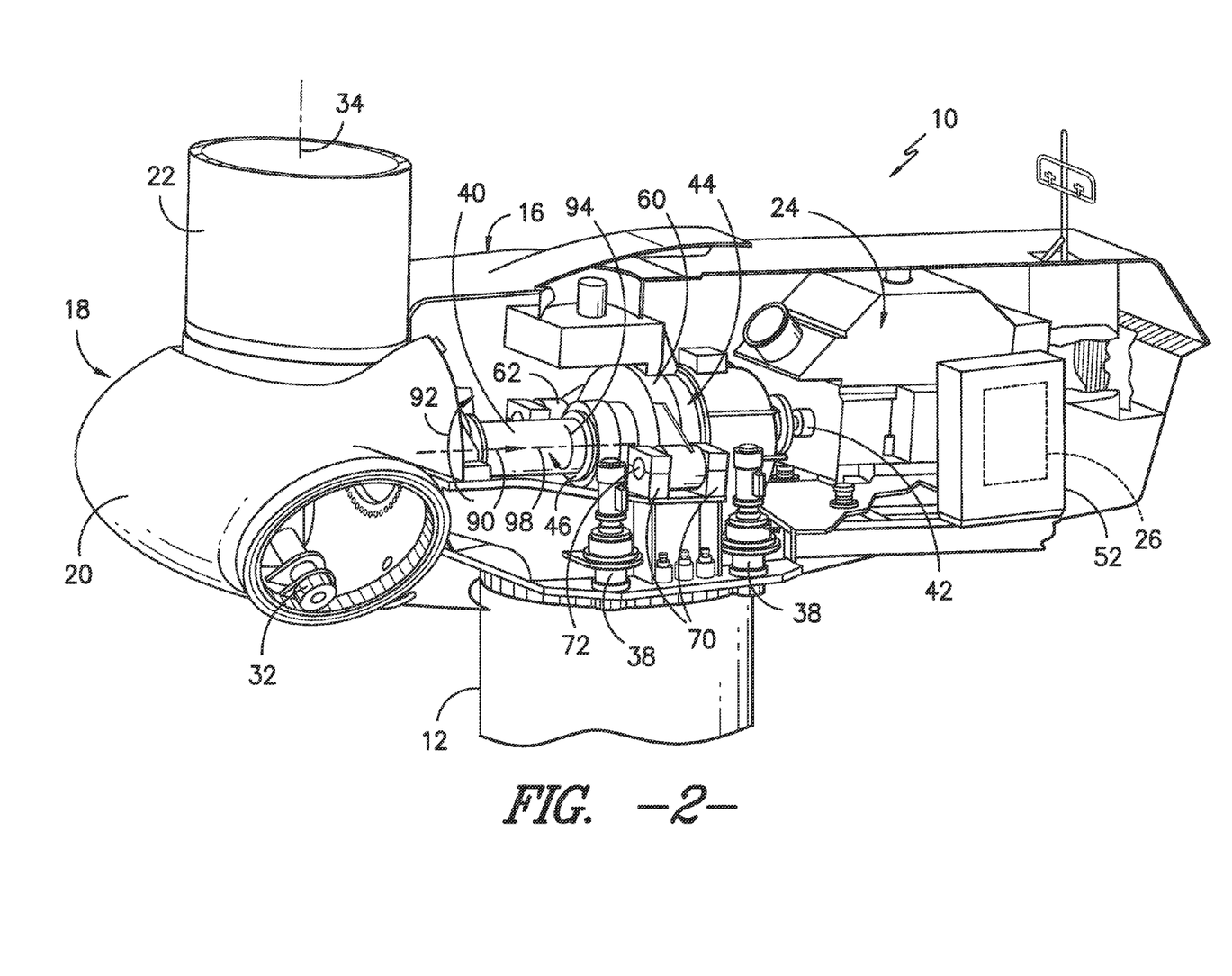
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40 (often referred to as a "direct-drive wind turbine").

It should be appreciated that the main shaft 40 may generally be supported within the nacelle by a support frame or bedplate 46 positioned atop the wind turbine tower 12. For example, the main shaft 40 may be supported by the bedplate 46 via one or more pillow blocks mounted to the bedplate 46.

Additionally, as indicated above, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described above, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment mechanism 32 of the wind turbine 10 (one of which is shown) through the pitch controller 30 for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

Figure 3:
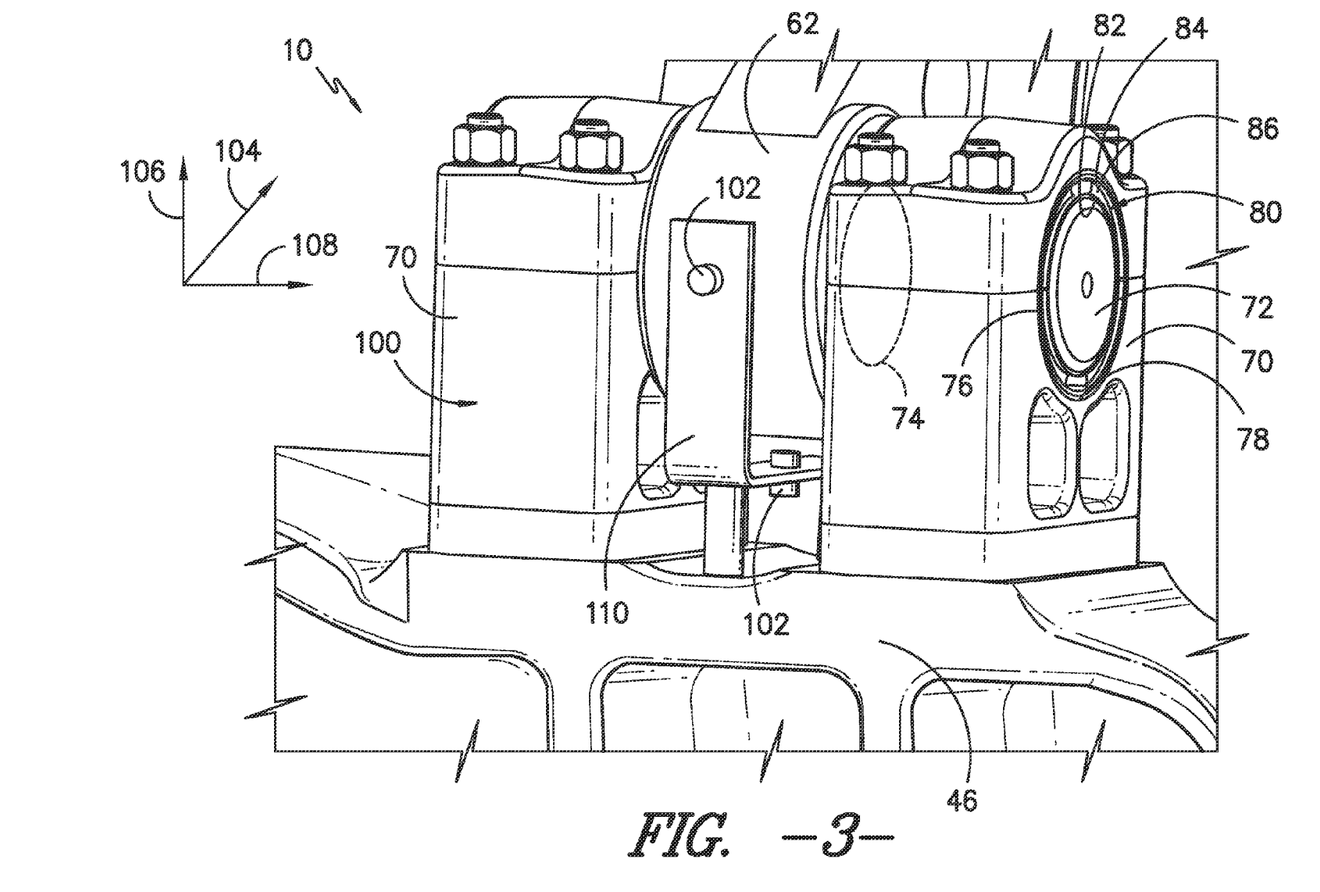
FIG. 3 illustrates a close-up perspective view of various components of a wind turbine and system for monitoring wind turbine loading according to one embodiment of the present disclosure.
Figure 4:
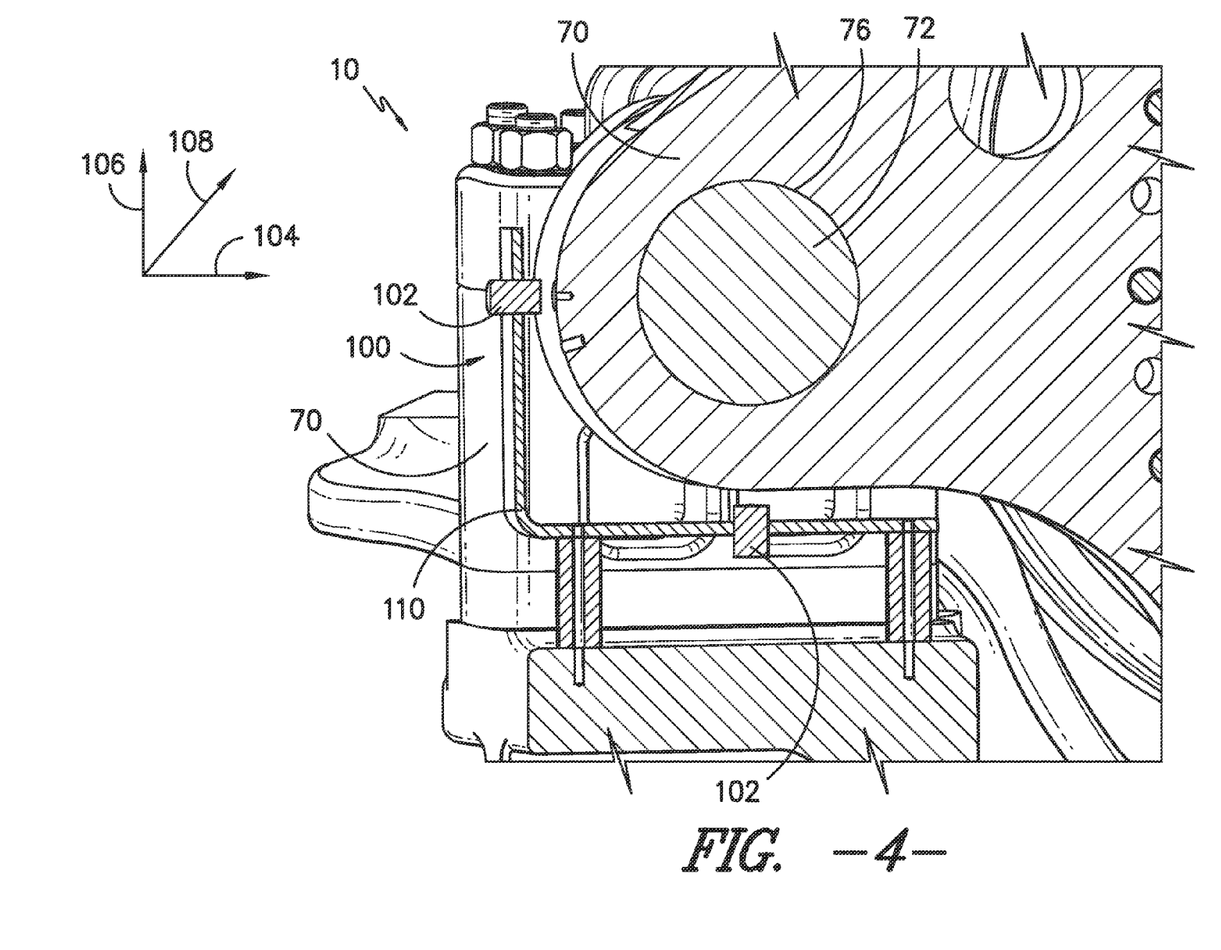
FIG. 4 illustrates a cross-sectional view of various components of a wind turbine and system for monitoring wind turbine loading according to one embodiment of the present disclosure.
Figure 5:
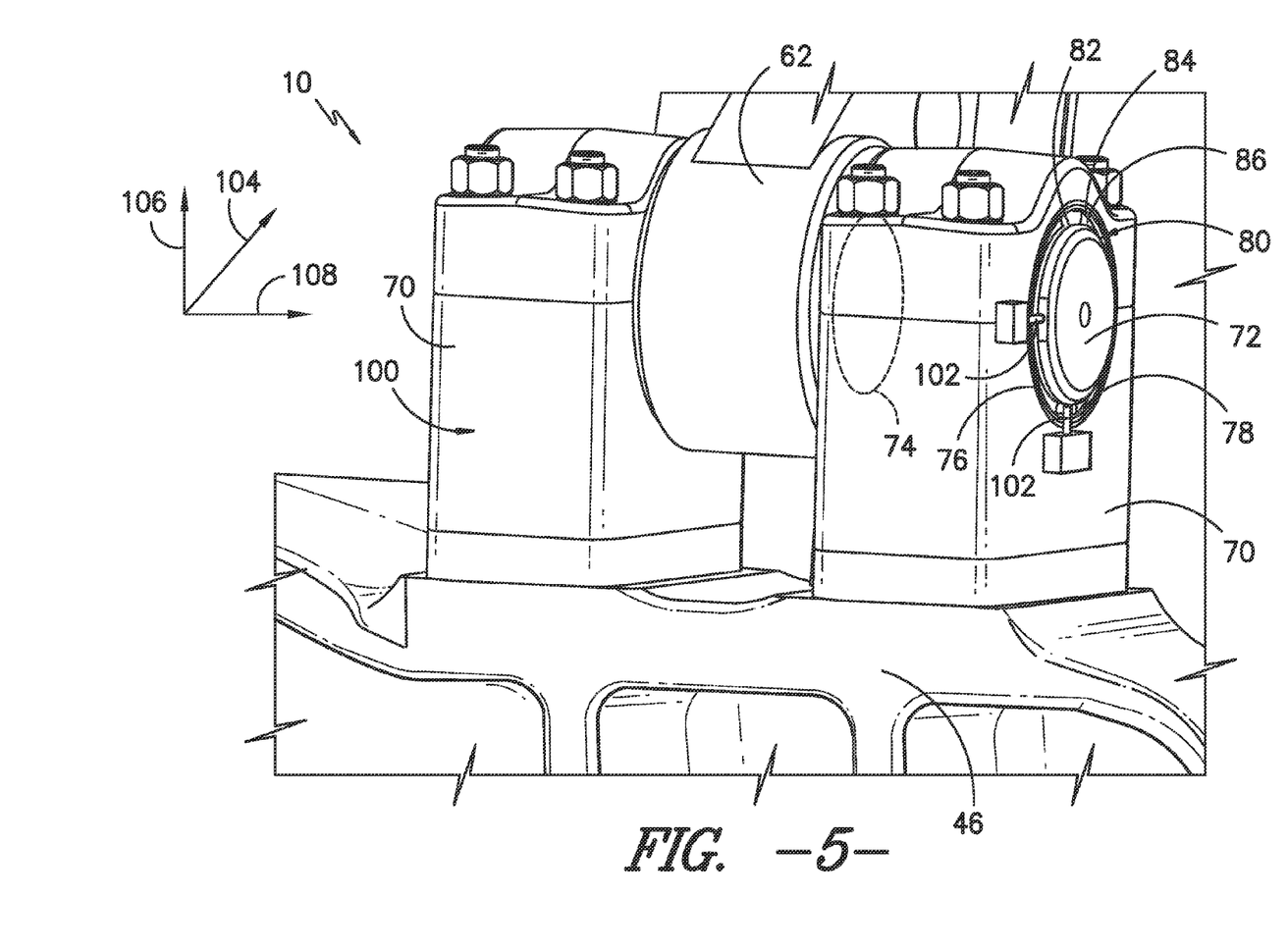
FIG. 5 illustrates a close-up perspective view of various components of a wind turbine and system for monitoring wind turbine loading according to another embodiment of the present disclosure.

Referring still to FIG. 2, as well as FIGS. 3 through 5, gearbox 44 may be coupled to main shaft 40, and may be mounted to the bedplate 46. As shown, gearbox 44 may include an outer casing 60 which may surround and generally enclose the internal gearbox components, such as the various gears, etc. thereof. Further, one or more torque arms 62 may extend from the outer casing 60. Typically, two torque arms 62 extend from the outer casing 60 on generally opposing sides of the casing 60. A torque arm 62 may generally facilitate reaction and transmission of loads to which the shaft 40, etc., are subjected by transmitting these loads from the gearbox 44 to, for example, the bedplate 46.

For example, one or more isolation mounts 70 may be coupled to a torque arm 62. In exemplary embodiments, two isolation mounts 70 may be coupled to a torque arm 62, and may be positioned on generally opposing sides of the torque arm 62 as shown. Loads may be transmitted from a torque arm 62 to the isolation mount(s) 70. An isolation mount 70 may be coupled to a torque arm 62 through a pin 72, which may extend through a bore hole 74 defined in the torque arm and a bore hole 76 defined in the isolation mount 70.

As shown, bore hole 76 defined in the isolation mount 70 may define an inner surface 78 of the isolation mount 70. A portion of a pin 72 may extend through the bore hole 74 and thus be surrounded by the inner surface 78. Further, one or more bushings 80 may be provided in the bore hole 76, each of which may be disposed between the pin 72 and inner surface 78 and each of which may at least partially surround a portion of the pin 72. In exemplary embodiments as shown, a bushing 80 may be generally U-shaped, arcuate and/or semi-circular in cross-section, and may include one or more layers. For example, a bushing 80 may include an inner layer 82 adjacent to the pin 72, an outer layer 84 distal from the pin 72 and adjacent to the inner surface 78, and one or more intermediate layers 86 between the inner layer 82 and outer layer 84. In some embodiments, two (as shown) or more bushings 80 may be utilized, and which may generally surround the portion of the pin 72 within the bore hole 74.

Isolation mounts 70 may in exemplary embodiments, as shown, be mounted to the bedplate 46. Any suitable fastening components, such as mechanical fasteners (nut-bolt combinations, nails, screws, rivets, etc.), or fastening techniques, such as welding, brazing, etc., may be utilized to mount an isolation mount 70 to the bedplate 46. In exemplary embodiments, mounting of an isolation mount 70 to the bedplate 46, and coupling of the isolation mount 70 to the torque arm 62, facilitates mounting of the gearbox 44 to the bedplate 46.

As discussed above, during operation of a wind turbine 10, the wind turbine 10 may be subjected to various loads. In particular, due to the loads to which the wind turbine 10 is subjected, the rotor shaft 40 may be subjected to various loads. Such loads may include axial (or thrust) loads 90 and moment loads, which may include bending moment loads 92 and torsional loads 94. The axial loads 90 may occur generally along a longitudinal axis 98 of the shaft 40, and the bending loads 92 and torsional loads 94 may occur about the longitudinal axis 98.

As discussed, improved systems and methods for monitoring loads in wind turbines 10, and in particular improved systems and methods for thus monitoring and if necessary controlling shaft 40 loading, are desired in the art. Thus, FIGS. 3 through 5 illustrate embodiments of a load monitoring system 100 for a wind turbine 10. System 100 may include, for example, the main shaft 40, bedplate 46, gearbox 44, and/or isolation mount(s) 70. System 100 may further include one or more sensors 102. Each sensor may be configured to measure displacement of a torque arm 62. Because loads are transmitted from the main shaft 40 through the torque arm 62 to isolation mounts 70, measuring of torque arm 62 displacement may accurately correspond to shaft 40 deflection due to loading. Thus, by measuring and interpolating torque arm 62 displacement, shaft 40 loading can be accurately and efficiently monitored.

Sensors 102 can measure displacement of the torque arm 62 in any suitable direction(s). For example, as shown in FIGS. 3 through 5, in some embodiments a sensor 102 may measure deflection generally along an x-axis 104, while in other embodiments a sensor 102 may measure deflection generally along a y-axis 106. The x-axis 104 and y-axis 106 may be defined relative to a z-axis 108, which may be parallel to the longitudinal axis 98 of the shaft 40 and which may generally extend through a longitudinal axis of the pin 72. The x-axis 104 and y-axis 106 may generally be perpendicular to each other and to the z-axis 108. In further alternative embodiments, a sensor 102 may measure deflection generally along the z-axis 108. Still further, a sensor 102 may measure deflection generally along any combination of axis 104, 106, 108 as desired.

Any suitable sensors 102 may be utilized to measure displacement of a torque arm 62. In some embodiments, a sensor 102 may be a proximity sensor (see FIGS. 3 and 4). In other embodiments, a sensor 102 may be a linear variable differential transformer ("LVDT") sensor (see FIG. 5). Such sensors 102 and other suitable sensors 102 may, in exemplary embodiments, generally measure displacement of a torque arm 62, such as along one or more axes 104, 106, 108.

In exemplary embodiments, as shown in FIGS. 3 through 5, a sensor 102 may be external to the isolation mount(s) 70 and torque arm(s) 62. As discussed below, such sensors 102 may directly or indirectly measure displacement of a torque arm 62. Alternatively, a sensor 102 may be internal to an isolation mount 70 or torque arm 62, and may directly or indirectly measure displacement of a torque arm 62.

In some embodiments, as shown in FIGS. 3 and 4, a sensor 102 may be mounted to the bedplate 46, either directly or indirectly. For example, as shown, a bracket 110 may support and align one or more sensors 102 with a torque arm 62. The bracket 110 may be mounted to the bedplate 46, thus indirectly mounting the sensors 102 to the bedplate 46. As mentioned, the sensor 102 may in exemplary embodiments be aligned with, and either spaced from or in contact with a torque arm 62. Thus, in these embodiments, sensors 102 may directly measure displacement of a torque arm 62.

In other embodiments, a sensor 102 may be mounted to an isolation mount 70. For example, as shown in FIG. 5, pin 72 may protrude from bore hole 76. A sensor 102 may be mounted to the exterior of the isolation mount 70, and may be aligned with the pin 72. Such sensor 102 may be spaced from or in contact with the pin 72. Displacement of the torque arm 62 may be transmitted through the pin 72 to the isolation mount 70. Thus, in these embodiments, by measuring displacement of the pin 72, sensors 102 may indirectly measure displacement of a torque arm 62.

In another embodiment, a sensor 102 may be mounted within an isolation mount 70. For example, a sensor 102 may be mounted such that a portion of the sensor 102 is nested within the isolation mount 70 and a portion protrudes into the bore hole 76. Thus, a tip end of the sensors 102 may for example be proximate and slightly spaced from or in contact with the pin 72. For example, this portion of the sensor 102 may extend between or through bushings 80. Similar to the embodiment of FIG. 5, in these embodiments, sensors 102 may indirectly measure displacement of a torque arm 62.

In further exemplary embodiments, a controller, such as controller 26, may be communicatively coupled to one or more sensors 102. The controller 26 may receive the measured torque arm 62 displacement information from the sensors 102. Further, the controller 26 may be configured to calculate a moment, such as a bending 92 moment and/or torsional 94 moment, of the shaft 40 based on such displacement information.

Further, in some embodiments, the controller 26 may additionally or alternatively be configured to adjust an operational parameter of the wind turbine 10 based on the received displacement information and calculated moments as discussed above. Operational parameters include, for example, pitch and/or yaw, as discussed above. Such adjustment of the operational parameters may adjust, such as desirably reduce, the loading on the shaft 40. For example, pitch and/or yaw may be adjusted to reduce loading, and in particular bending 92 and/or torsional 94 loading, on the shaft 40, as desired or required during operation of the wind turbine 10. Alternative operational parameters include rotor speed, generator torque, and drivetrain damping. For example, actuation of a mechanical brake employed in the drivetrain can be applied to slow the rotor and reduce loading. Electrical torque loading of the generator as enabled through a converter system coupled to the generator can be applied to control loading on the drivetrain. Various damping mechanisms can be utilized to increase or decrease damping, thus controlling loading.

Controller 26 may additionally or alternatively be utilized to collect and/or store the received displacement information and calculated moments for use in performance, diagnostic and/or life management related functions. For example, such information can be utilized for remote monitoring and diagnostics of the various wind turbine 10 components. Additionally, annual energy production as a function of loading can be reviewed and analyzed based on the received displacement information.

In some embodiments, the controller 26 may be configured to receive displacement information, collect and/or store the information, and/or adjust operational parameters of the wind turbine 10 according to a constant feedback loop or at predetermined increments. Thus, the controller 26 may include suitable software and/or hardware for constantly or incrementally monitoring and calculating moments in real-time, and for adjusting operational parameters as required in order for such moments to be maintained within a predetermined window or above or below a predetermined minimum or maximum amount.

The present disclosure is further directed to methods for monitoring wind turbine 10 loading. Such methods may include, for example, operating the wind turbine 10, as discussed above. Such methods may further include detecting displacement of a torque arm 62, such as discussed above. Such methods may further include calculating a moment for a main shaft 40 of the wind turbine 10 based on the displacement of the torque arm 62, as discussed above.

Further, in exemplary embodiments, a method may include adjusting an operational parameter of the wind turbine 10, such as pitch and/or yaw, based on the calculated moment(s), such as discussed above for example.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring wind turbine loading, the system comprising:
    a main shaft;
    a bedplate;
    a gearbox coupled to the main shaft and mounted to the bedplate, the gearbox comprising an outer casing and a torque arm extending from the outer casing;
    an isolation mount coupled to the torque arm; and
    a plurality of sensors indirectly mounted to the bedplate via a bracket mounted on the bedplate, the bracket having a shape and the plurality of sensors arranged on the bracket such that at least two of the plurality of sensors measure displacement of the torque arm along different respective axes.

2. The system of claim 1, wherein at least one of the plurality of sensors is a linear variable differential transformer sensor.

3. The system of claim 1, wherein at least one of the plurality of sensors is a proximity sensor.

4. The system of claim 1, further comprising a controller communicatively coupled to the plurality of sensors.

5. A wind turbine, comprising:
    a tower;
    a nacelle mounted to the tower;
    a rotor coupled to the nacelle, the rotor comprising a hub and a plurality of rotor blades;
    a main shaft extending from the rotor;
    a bedplate;
    a gearbox coupled to the main shaft and mounted to the bedplate, the gearbox comprising an outer casing and a torque arm extending from the casing;
    an isolation mount connected to the torque arm; and
    a sensor mounted to the isolation mount and oriented to measure displacement of the torque arm by detecting relative movement of a pin displaced through the isolation mount by the torque arm.

6. The wind turbine of claim 5, wherein the sensor is external to the isolation mount and the torque arm.

7. The wind turbine of claim 5, wherein the torque arm and isolation mount each define a bore hole therethrough, and wherein the pin extends through the bore holes of the torque arm and isolation mount, coupling the isolation mount to the torque arm.

8. The wind turbine of claim 7, wherein the isolation mount further comprises a bushing disposed in the bore hole of the isolation mount and at least partially surrounding the pin.

9. The wind turbine of claim 5, further comprising a controller communicatively coupled to the sensor.

10. A method for monitoring wind turbine loading, the method comprising:
    mounting a plurality of sensors to a bedplate of the wind turbine via a bracket mounted on the bedplate such that at least two of the plurality of sensors are aligned with different respective axes of a torque arm of a gearbox of the wind turbine;
    operating the wind turbine;

detecting, via the plurality of sensors, displacement of the torque arm of the gearbox along the different respective axes during operation of the wind turbine;
calculating a moment for a main shaft of the wind turbine based on the displacement of the torque arm; and
adjusting an operational parameter of the wind turbine based on the calculated moment.

* * * * *